US010577043B2

(12) United States Patent
Nakahira et al.

(10) Patent No.: US 10,577,043 B2
(45) Date of Patent: Mar. 3, 2020

(54) SADDLE-RIDING VEHICLE

(71) Applicant: HONDA MOTOR CO., LTD., Tokyo (JP)

(72) Inventors: Shota Nakahira, Wako (JP); Takashi Sasaki, Wako (JP); Daiki Goto, Wako (JP); Satoshi Matsushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 15/806,668

(22) Filed: Nov. 8, 2017

(65) Prior Publication Data

US 2018/0127044 A1    May 10, 2018

(30) Foreign Application Priority Data

Nov. 8, 2016    (JP) ................................ 2016-218325

(51) Int. Cl.
*B62J 23/00*    (2006.01)
*B62J 35/00*    (2006.01)
(Continued)

(52) U.S. Cl.
CPC ............... *B62J 23/00* (2013.01); *B62J 17/00* (2013.01); *B62J 35/00* (2013.01); *B62K 11/04* (2013.01)

(58) Field of Classification Search
CPC . B62J 23/00; B62J 17/00; B62J 35/00; B62K 11/04
See application file for complete search history.

(56) References Cited

U.S. PATENT DOCUMENTS

2010/0001551 A1    1/2010  Fukuyama et al.
2013/0306391 A1*  11/2013  Kontani ................. B62K 11/00
                                                                180/219
(Continued)

FOREIGN PATENT DOCUMENTS

CN          105966508 A      9/2016
EP            2949567 A1    12/2015
(Continued)

OTHER PUBLICATIONS

Oct. 2, 2018 Office Action issued in Japanese Patent Application No. 2016-218325.
(Continued)

*Primary Examiner* — Anne Marie M Boehler
*Assistant Examiner* — Marlon A Arce
(74) *Attorney, Agent, or Firm* — Squire Patton Boggs (US) LLP

(57) ABSTRACT

A saddle-riding vehicle include a body frame, an engine which is supported on the body frame, an exhaust pipe which extends rearward from a front portion of the engine 41, a fuel tank which is disposed on a side of the engine 41, a skid guard which covers the engine and the exhaust pipe from fronts thereof, and a side guard which covers a side portion of the fuel tank. The skid guard and the side guard are disposed to have an overlap portion where the skid guard and the side guard overlap partially. Therefore, the saddle-riding vehicle prevents mud or stone from entering an inside of a guard member, and prevents a fuel tank from being exposed through a gap to eliminate a deterioration of an external design of the saddle-riding vehicle.

5 Claims, 8 Drawing Sheets

(51) Int. Cl.
*B62J 17/00* (2020.01)
*B62K 11/04* (2006.01)

(56) References Cited

U.S. PATENT DOCUMENTS

| | | | | |
|---|---|---|---|---|
| 2015/0314824 A1* | 11/2015 | LeBreton | ............... | B62K 19/34 |
| | | | | 280/304.3 |
| 2016/0090152 A1 | 3/2016 | Sasaki | | |
| 2016/0264201 A1* | 9/2016 | Inomata | .................. | B62J 37/00 |

FOREIGN PATENT DOCUMENTS

| JP | 08253185 | * | 1/1996 |
|---|---|---|---|
| JP | H08253185 A | | 10/1996 |
| JP | 2004-155229 A | | 6/2004 |
| JP | 2010013065 A | | 1/2010 |

OTHER PUBLICATIONS

European Search Report application No. 17200504.3 dated Apr. 5, 2018.

* cited by examiner

SADDLE-RIDING VEHICLE

CROSS REFERENCE TO RELATED APPLICATIONS

This application is based on Japanese Patent Application (No. 2016-218325) filed on Nov. 8, 2016, the contents of which are incorporated herein by reference.

TECHNICAL FIELD

The present invention relates to a saddle-riding vehicle, and more particularly to a saddle-riding vehicle including a skid guard provided forward of an engine.

BACKGROUND ART

In a saddle-riding vehicle disclosed in patent literature 1, a laterally-divided fuel tank is provided above a main frame which extends rearward from a head pipe so as to straddle the main frame. This fuel tank protrudes downward greatly so as to ensure a great capacity and is constructed to cover the engine from sides thereof. In addition, patent literature 1 discloses a construction in which a front portion and a lower portion of the engine is covered by a skid guard (an under guard) and sides of the fuel tank are partially covered by a front cowl.

RELATED ART LITERATURE

Patent Literature

Patent Literature 1: JP-A-2004-155229

SUMMARY OF THE INVENTION

Problem that the Invention is to Solve

In the construction disclosed in patent literature 1, the front cowl and the skid guard are both disposed as guard members which cover partially a lower portion of the fuel tank. However, when looking at the vehicle from a side thereof, a gap is formed by the front cowl and the skid guard which are provided in the way described above. There are fears that the external design of the fuel tank is deteriorated due to the gap. Additionally, there are fears that mud or stone enters the inside of the guard members from the gap portion. Further, when attempting to increase the rigidity of the fuel tank, the weight of the fuel tank is also increased.

The invention has been made in view of the situations described above, and an object thereof is to provide a saddle-riding vehicle which prevents mud or stone from entering an inside of a guard member, and which prevents a fuel tank from being exposed through a gap to eliminate a deterioration of an external design of the saddle-riding vehicle.

Means for Solving the Problem

With a view to achieving the object described above, according to an invention of (1), there is provided a saddle-riding vehicle including:
a body frame;
an engine which is supported on the body frame;
an exhaust pipe which extends rearward from a front portion of the engine;
a fuel tank which is disposed on a side of the engine;
a skid guard which covers the engine and the exhaust pipe from fronts thereof; and
a side guard which covers a side portion of the fuel tank,
wherein the skid guard and the side guard are disposed to have an overlap portion where the skid guard and the side guard overlap partially.

According to an invention of (2), in addition to the configuration of (1),
the side guard is provided to cover a tank outermost portion, which protrudes most outward of the vehicle, of the fuel tank, and
the overlap portion is positioned farther forward of the vehicle than the tank outermost portion.

According to an invention of (3), in addition to the configuration of (1),
the overlap portion is formed between a front end portion of the side guard and a rear end portion of the skid guard, and
the front end portion of the side guard is positioned farther inward in a vehicle's widthwise direction than the rear end portion of the skid guard.

According to an invention of (4), in addition to the configuration of (1),
a gap is provided in the overlap portion in the vehicle's widthwise direction.

According to an invention of (5), in addition to the configuration of (4),
the gap is opened outward in the vehicle's widthwise direction and toward a rear of the vehicle.

According to an invention of (6), in addition to the configuration of (1),
the side guard is fastened to the vehicle only at a rear portion thereof which faces the rear of the vehicle.

Advantages of the Invention

According to the invention of (1), the skid guard and the side guard are disposed to have the overlap portion where the skid guard and the side guard overlap partially, and therefore, the fuel tank is prevented from being exposed, and hence, a deterioration of an external design of the saddle riding vehicle is eliminated. Additionally, it can be made difficult for mud or stone to enter from the gap between the skid guard and the side guard, thereby making it possible to enhance the tank protecting functions of the skid guard and the side guard. Further, the skid guard and the side guard are formed by separate members, whereby servicing for maintenance is facilitated. In addition, since the skid guard and the side guard overlap partially, the rigidity of the periphery of the fuel tank can be enhanced without increasing the weight of the fuel tank.

According to the invention of (2), since the side guard is provided to cover the tank outermost portion of the fuel tank which protrudes most outward of the vehicle, it is possible to provide a superior fuel tank protecting function when the vehicle falls down. Additionally, the overlap portion is positioned farther forward of the vehicle than the tank outermost portion, and this makes it difficult for a foot of the rider to be caught by the overlap portion, thereby improving the operability of the vehicle.

According to the invention of (3), the overlap portion is formed between the front end portion of the side guard and the rear end portion of the skid guard, and the front end portion of the side guard is positioned farther inward in the vehicle's widthwise direction than the rear end portion of the skid guard. Thus, the front end portion of the side guard can be covered by the rear end portion of the skid guard.

According to the invention of (4), the gap is provided in the overlap portion in the vehicle's widthwise direction, and therefore, air within the skid guard can be caused to flow along the outer surface side of the fuel tank to enhance the air guiding property, thereby making it possible to enhance the cooling effect of the fuel tank.

According to the invention of (5), the gap is opened outward in the vehicle's widthwise direction and toward the rear of the vehicle, whereby air within the skid guard can be caused to flow outward in the vehicle's widthwise direction from the overlap portion, thereby making it possible to improve the aerodynamic characteristics of the vehicle. In addition, warm air can be guided to move away from the fuel tank, so that warm air can be guided to outer sides of leg portions of the rider, thereby making it difficult for warm air to flow against the rider.

According to the invention of (6), the side guard is fastened to the vehicle only at the rear portion thereof which faces the rear of the vehicle, whereby the number of fastening portions can be reduced, which can provide superior assembling and maintenance properties.

MODE FOR CARRYING OUT THE INVENTION

Figure 1:
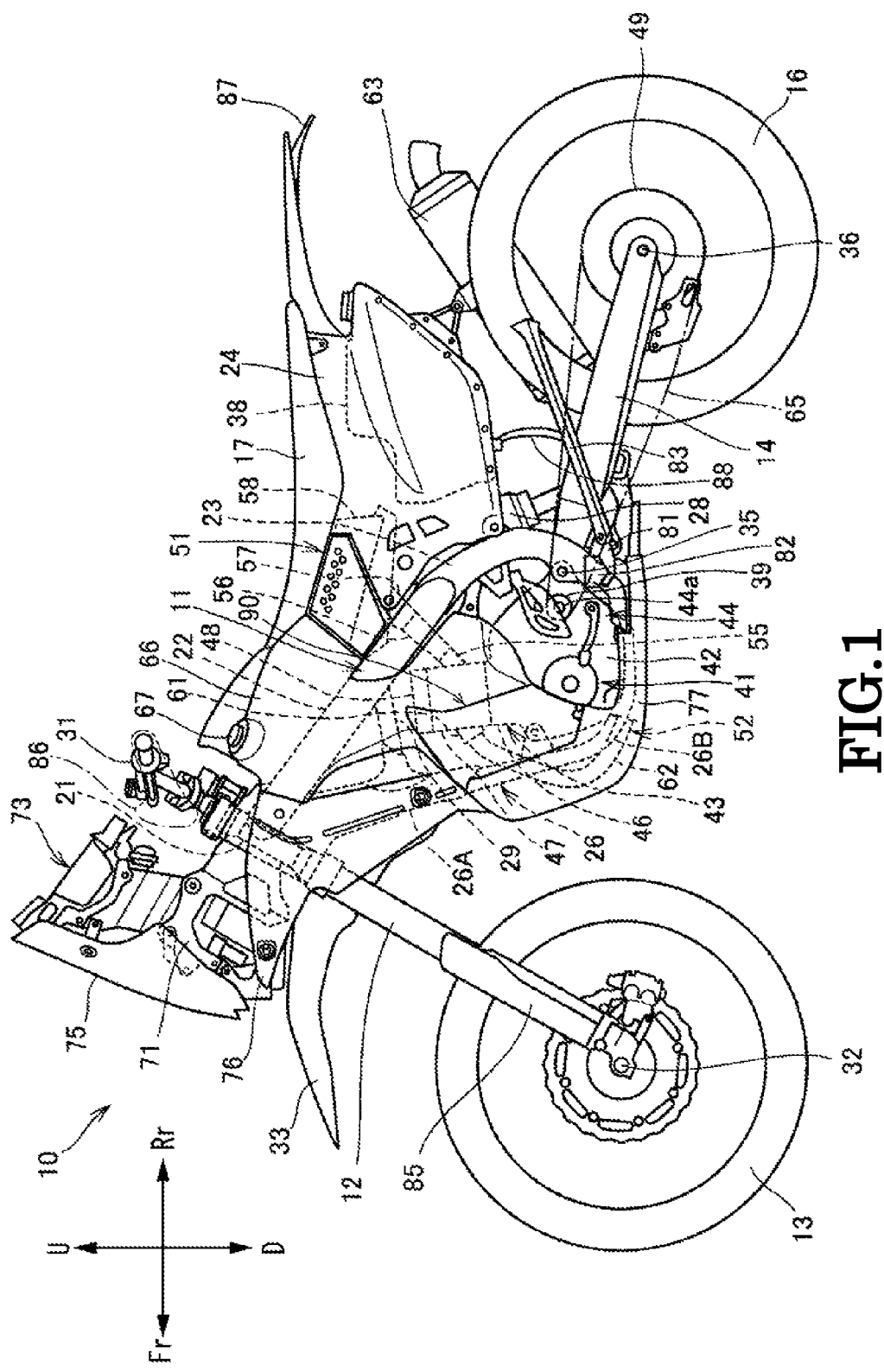
FIG. 1 is a left side view of a motorcycle according to an embodiment of the invention.

Hereinafter, referring to FIGS. 1 to 8, a motorcycle, which is a saddle-riding type vehicle according to an embodiment of the invention, will be described. The drawings should be seen in a direction in which given reference numerals look proper. In the following description, front and rear, left and right, and upward and downward directions are those as viewed from a rider. In addition, the front, rear, left, right, up and down sides of the vehicle will be denoted as Fr, Rr, L, R, U and D, respectively, in the drawings.

FIG. 1 is a left side view of a motorcycle 10 according to an embodiment of the invention. As shown in FIG. 1, the motorcycle 10 has a body frame 11 which makes up a framework of the motorcycle 10, and the body frame includes a head pipe 21, a pair of left and right main frames 22, a pair of left and right center frames 23, a rear frame 24, and a down frame 26. The motorcycle 10 is a saddle-riding rally vehicle in which a front wheel 13 is supported at a front end portion of the body frame 11 via a front fork 12, a rear wheel 16 is supported at a lower portion of the body frame 11 via a swing arm 14, and a seat 17 is supported at a rear portion of the body frame 11.

The head pipe 21 makes up the front end portion of the body frame 11, and the front fork 12 is supported on this head pipe 21 to be steered or turned. A handlebar 31 is attached to an upper end portion of the front fork 12, and the front wheel 13 is supported at a lower end portion of the front fork 12 via an axle shaft 32.

The main frames 22 extend straight to the rear while being inclined obliquely downward from the head pipe 21 when seen from the side. The center frames 23 are curved from rear end portions of the main frames 22 into a substantially arc-like shape which projects convexly to the rear, and a pivot shaft 35 is supported at portions of the center frames 23 which are positioned downward from rearmost curved portions of the center frames 23 while extending in a vehicle's widthwise direction. A front end portion of the swing arm 14 is supported on the pivot shaft 35 to swing up and down, and the rear wheel 16 is supported at a rear end portion of the swing arm 14 via an axle shaft 36.

The rear frame 24 is configured as, for example, a resin monocoque frame and are attached to the pair of left and right main frames 22 and the pair of left and right center frames 23. A resin rear fuel tank 38 is mounted inside a rear portion of the rear frame 24.

The down frame 26 is made up of a down frame upper portion 26A which makes up an upper portion and a pair of left and right down frame lower portions 26B which makes up a lower portion of the down frame 26. The down frame upper portion 26A extends substantially downward from the head pipe 21 at a steeper angle than an angle at which the main frames 22 extend. When seen from the side, the down frame lower portions 26B extend so as to be extended from a lower end portion of the down frame upper portion 26A and are divided laterally as a left and right down frame lowers. The down frame lower portions 26B are further curved to extend to the rear substantially horizontally and are then connected to lower end portions of the pair of left and right center frames 23.

A plurality of cross-pipes (not shown) extending in the vehicle's widthwise direction are provided to straddle a space between the left and right center frames 23, and a rear cushion unit 28 is provided to connect a cross-pipe provided thereabove and a portion of the swing arm 14. A reinforcement frame 29 is provided to connect the main frames 22 and the down frame upper portion 26A together. A cross-pipe (not shown) extending in the vehicle's widthwise direction is provided to straddle a space between the left and right down frame lower portions 26B to connect them together.

An engine 41 is supported on the down frame lower portions 26B of the body frame 11 and the pivot shaft 35. The engine 41 includes a crankcase 42 and a cylinder portion 43 which extends upward from a front upper portion of the crankcase 42, and a transmission 44 is additionally provided at a rear portion of the crankcase 42.

The cylinder portion 43 includes a cylinder block 46 which is attached to the crankcase 42, a cylinder head 47 which is attached to an upper end portion of the cylinder block 46, and a cylinder head cover 48 which closes an upper opening of the cylinder head 47. An intake unit 51 and an exhaust unit 52 are connected to a rear surface and a front surface of the cylinder head 47, respectively.

The intake unit 51 includes an intake pipe 55 which is provided on the cylinder head 47, a throttle body 56 which is connected to a rear end portion of the intake pipe 55, and an air cleaner 58 which is connected to a rear end portion of the throttle body 56 via a connecting tube 57. The intake pipe 55, the throttle body 56 and the connecting tube 57 extend substantially straight to the rear while being inclined obliquely upward from the cylinder head 47 to be connected to the air cleaner 58.

The exhaust unit 52 includes an exhaust manifold 61 which is provided at a front portion of the cylinder head 47 (the engine 41), an exhaust pipe 62 which is connected to a front end portion of the exhaust manifold 61 and which extends to the rear, and a muffler 63 which is connected to a rear end portion of the exhaust pipe 62. The exhaust pipe 62 extends to the front while being inclined obliquely downward from the front end portion of the exhaust manifold 61 and is further curved to the right in the vehicle's widthwise direction and then to the rear to extend to the rear at a right lower portion of a vehicle body, eventually being connected to the muffler 63 on a right-hand side of the swing arm 14.

A drive sprocket 39 is attached to an output shaft 44a of a transmission 44, and a chain 65 is extended to be wound around the drive sprocket 39 and a driven sprocket 49 which is provided integrally on the rear wheel 16, so as to transmit a driving force from the transmission 44 to the rear wheel 16.

A pair of left and right front fuel tanks 66 are disposed on both sides of the main frames 22, the down frame 26 and the engine 41. In a rally race, since the motorcycle 10 runs a long distance, a great tank capacity is ensured by the pair of left and right front fuel tanks 66 and the rear fuel tank 38. A left and right fuel filler caps 67, configured to close fuel filler ports, are provided at upper portions of the front fuel tanks 66 (also refer to FIG. 3).

A front stay 71, which projects to the front, is fixed to a front portion of the head pipe 21, and a headlamp, rally equipment 73 such as a road book holder, a windscreen 75 and the like are supported on the front stay 71.

The motorcycle 10 includes, as cover members, a pair of left and right shrouds 76 which cover an upper portion of the front fork 12 and an upper portion of the down frame 26 from both sides thereof, a skid guard 77 which covers a lower portion of the engine 41, the exhaust pipe 62 and a lower portion of the front fuel tank 66 from fronts thereof, and a pair of left and right side guards 90 which cover side surfaces of lower portions of the front fuel tanks 66.

As other cover members, a pair of left and right fork covers 85 which cover lower portion of the front fork 12 from a front thereof and a front mudguard 33 which covers the front wheel 13 from above are attached to the front fork 12, and grip guards 86 which cover grips from fronts thereof are attached to the handlebar 31. A rear mudguard 87 which covers the rear wheel 16 from above and a mudguard 88 which is disposed forward of the rear wheel 16 are attached to the periphery of the rear wheel 16.

Rider's steps 82 are supported at lower portions of the center frames 23 via step brackets 81, and a side stand 83 is also supported at the lower portion of the center frame 23.

Figure 2:
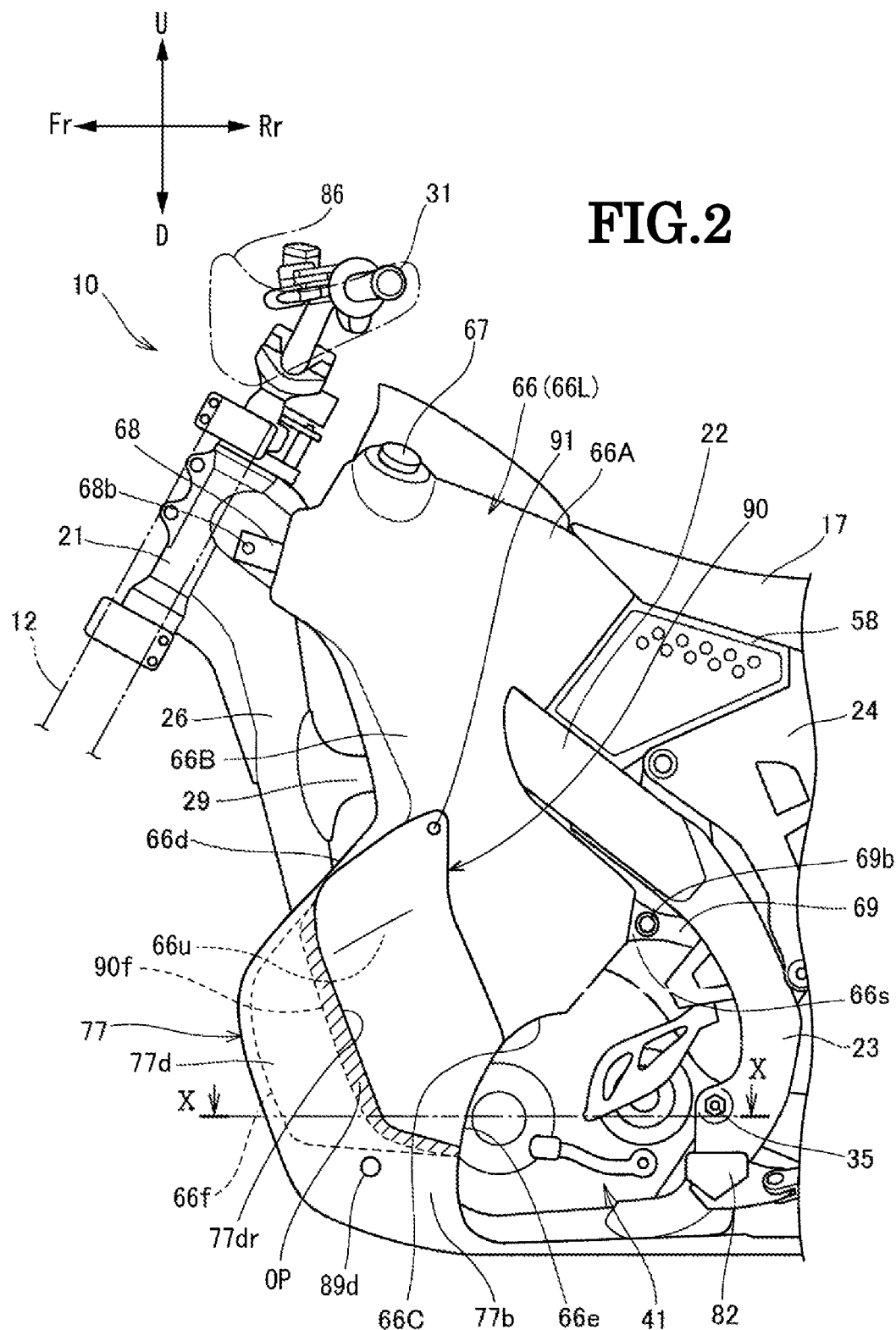
FIG. 2 is a left side view of a main part of the motorcycle shown in FIG. 1 which shows a front part thereof.
Figure 3:
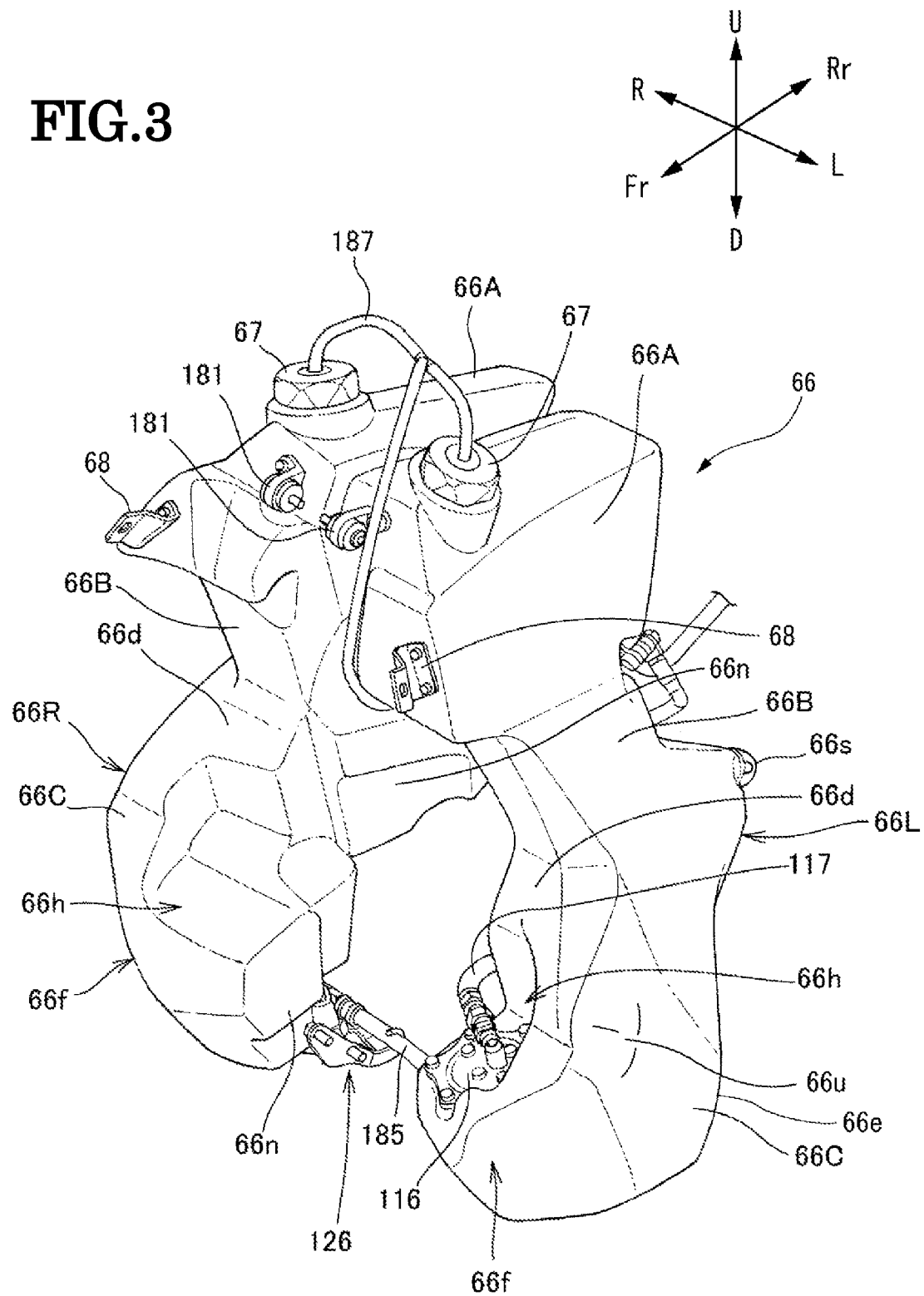
FIG. 3 is a perspective view of a fuel tank shown in FIG. 1.

FIG. 2 shows the periphery of the front fuel tank 66 at the front part of the motorcycle 10 with part of the front fork 12, the front wheel 13 and the shrouds 76 omitted from illustration. FIG. 3 is a perspective view of the front fuel tank 66 which is removed from the vehicle body.

As shown in FIGS. 2 and 3, the front fuel tank 66 (66L) is formed into an integral unit including, sequentially from above, an upper tank portion 66A, a middle tank portion 66B and a lower tank portion 66C. A front end portion of the upper tank portion 66A is attached to the main frame 22 via a tank bracket 68 with screws 68b, and a rear end portion 66s of the lower tank portion 66C is attached to the center frame 23 with screws 69b via a tank bracket 69.

The upper tank portion 66A is provided to extend upward from a transversely outer side of the main frame 22, and the air cleaner 58 is disposed behind the upper tank portion 66A. The middle tank portion 66B is a constricted portion from the upper tank portion 66A and the lower tank portion 66C. The lower tank portion 66C is positioned below the main frame 22 and the reinforcement frame 29 and is formed to protrude in the vehicle's widthwise direction or transversely outward as a result of having a tank outermost portion 66u which protrudes most transversely outward (refer to FIGS. 3 and 4).

As shown in FIG. 3, the front fuel tank 66 has the pair of left and right fuel tanks 66L, 66R which are substantially laterally symmetrical with each other. The left and right upper tank portions 66A, 66A are fixed to the corresponding main frames 22 by fastening portions 181 which are provided at upper front portions thereof, in addition to the tank brackets 68 described above. The left and right lower tank portions 66C, 66C are fixed to the down frame lower portions 26B via corresponding stays 126 at bottom portions thereof and are fixed to the corresponding center frames 23 (refer to FIG. 2) via corresponding brackets 69 (refer to FIG. 2) at the rear end portions 66s thereof.

The left and right front fuel tanks 66L, 66R are connected together by a connecting hose 185 which are connected to the bottom portions thereof. Fuel within the right front fuel tank 66R is guided into an interior of the left front fuel tank 66L via the connecting hose 185 by means of a suction force of a fuel pump 116. A breather hose 187, which connects the fuel filler caps 67, 67 together and extends downward from a halfway portion between the fuel filler cps 67, 67, is attached to the left and right fuel filler caps 67, 67, so that pressures inside the front fuel tanks 66L, 66R are kept constant by opening a lower end portion of the breather hose 187 to the atmosphere.

Front end portions of the lower tank portions 66C are covered by the skid guard 77, which will be described below, from fronts and sides thereof, as shown in FIG. 2. Also, referring to FIGS. 5 and 6, front upper surfaces 66d of the lower tank portions 66C are covered by protruding portion upper surfaces 77du of the skid guard 77, front walls 66f of the lower tank portions 66C are covered by a front wall 77c and protruding portions 77d, 77d of the skid guard 77, and lower end rear end portions 66e of the lower tank portions 66C are covered by side walls 77b of the skid guard 77.

Tank outermost portions 66u on side surface portions of the lower tank portions 66C are covered by the side guards 90. As will be described in detail later, the side guards 90 are disposed to provide overlap portions OP which partially overlap the skid guard 77 at portions lying farther forward of the motorcycle 10 than the tank outermost portions 66u.

Figure 4:
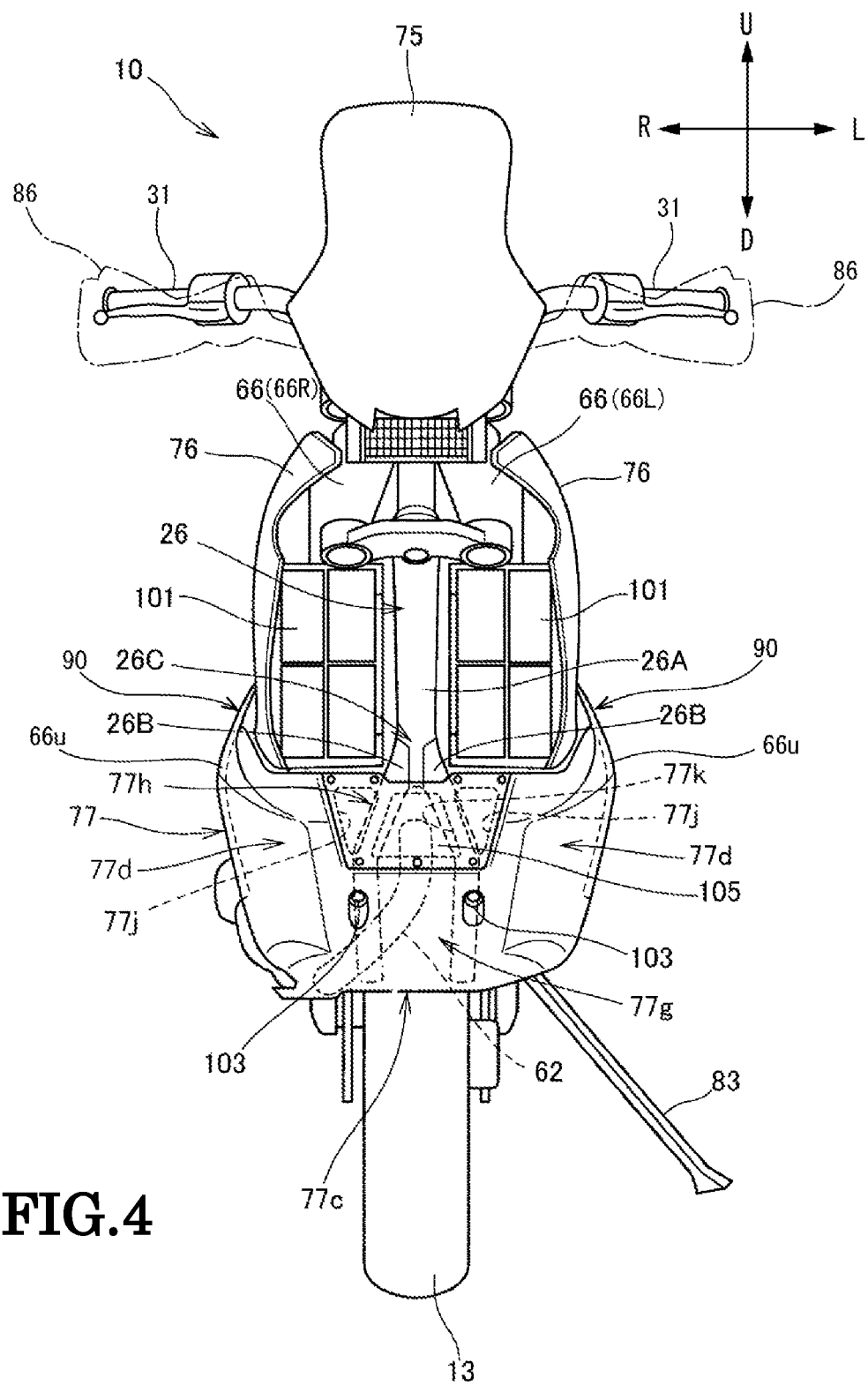
FIG. 4 is a front view of the motorcycle shown in FIG. 1 with part of a front fork and a front wheel omitted from illustration.

FIG. 4 shows a front view of the motorcycle 10 from the front thereof with part of the front fork 12 and the front wheel 13 omitted from illustration. As shown in FIG. 4, the down frame 26 is made up of the down frame upper portion 26A which extends straight in an up-and-down direction, and the pair of left and right down frame lower portions 26B, 26B which are divided from the lower end portion of the down frame upper portion 26A to extend obliquely downward and transversely outward, extending further downward when seen from the front. The down frame 26 includes a branch portion 26C where the down frame upper portion 26A is divided into the left and right down frame lower portions 26B, 26B.

A pair of left and right radiators 101, 101 are disposed on both sides of the down frame 26, and the pair of shrouds 76, 76 are disposed to cover the radiators 101, 101 from outer sides thereof. The radiators 101 are each formed into a vertically elongated rectangular shape and are cooled by running air which strikes them directly and running air which is collected by the shrouds 76.

Figure 5:
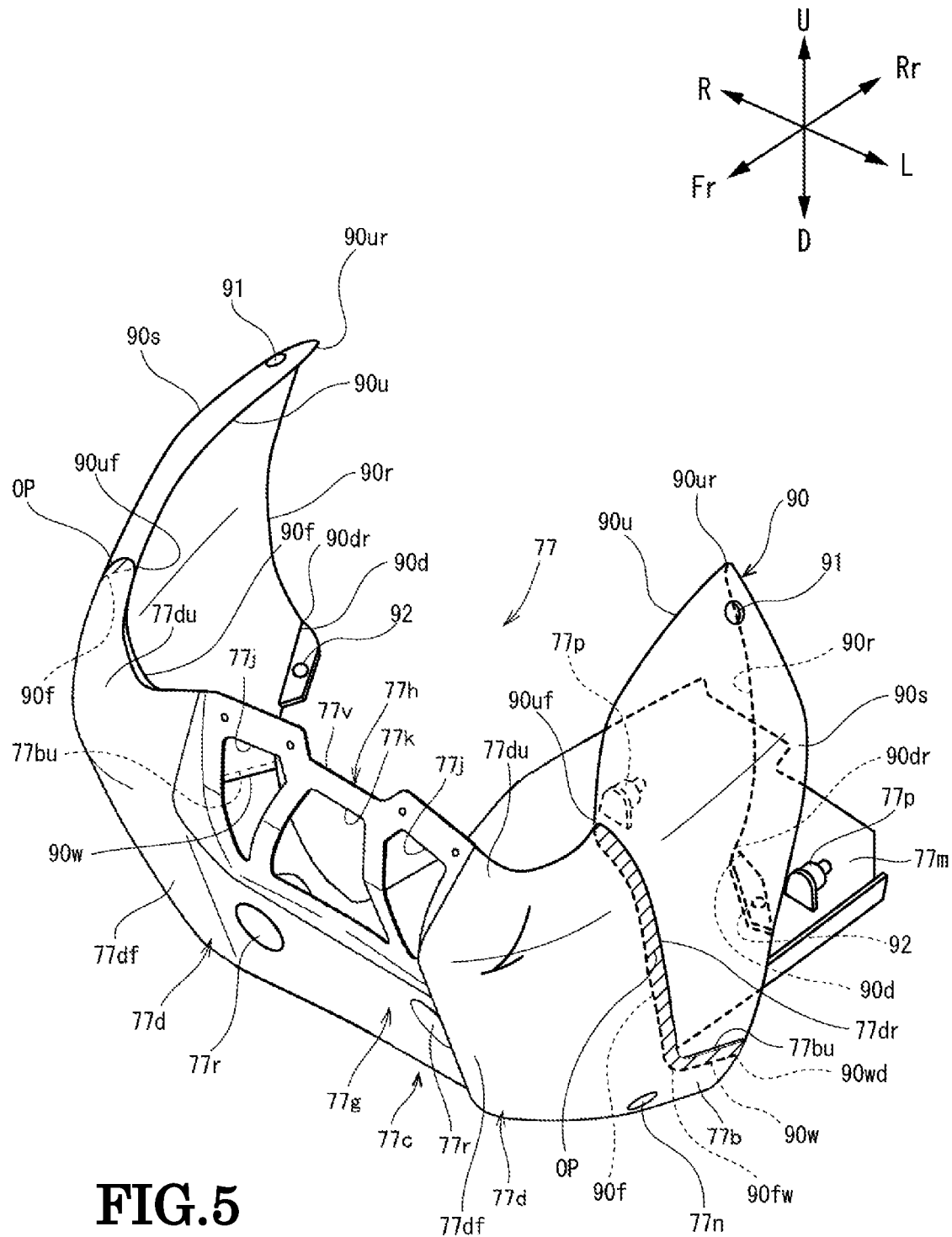
FIG. 5 is a perspective view showing a skid guard and side guards which are shown in FIG. 2.
Figure 7:
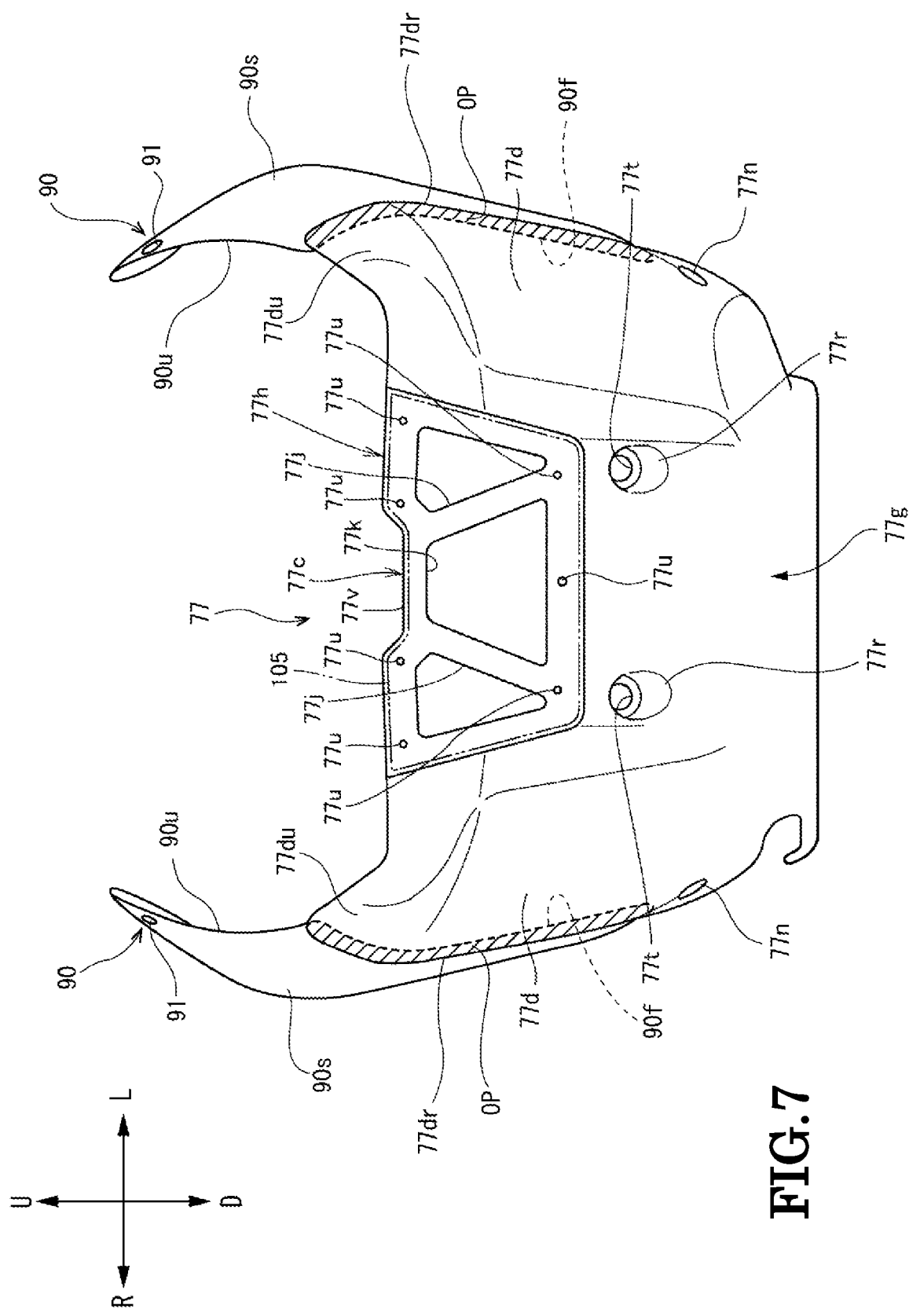
FIG. 7 is a front view showing the skid guard and the side guards which are shown in FIG. 2.
Figure 8:
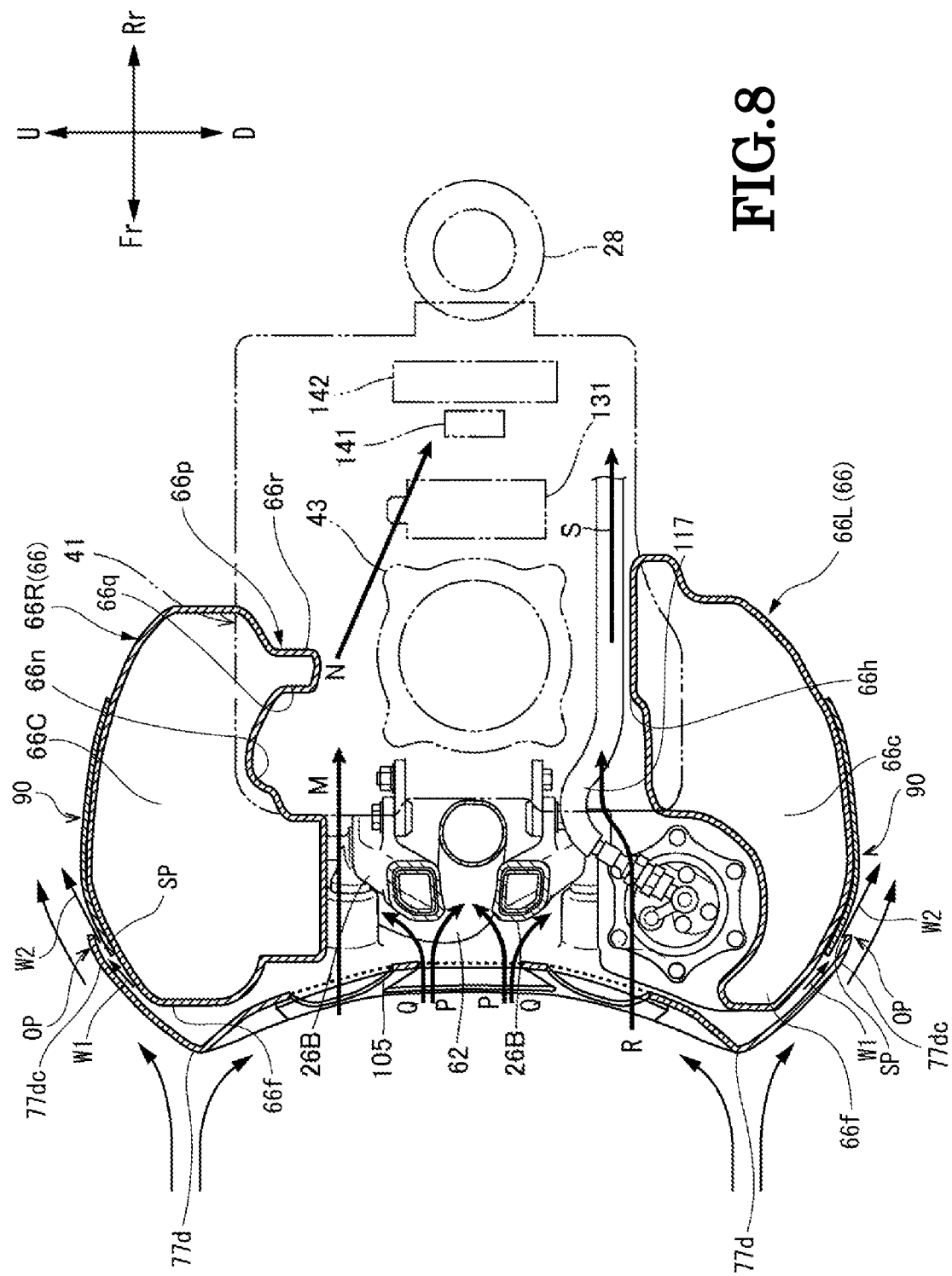
FIG. 8 is a sectional view taken along a line X-X in FIG. 2.

Hereinafter, referring to FIGS. 5 to 8, the constructions of the skid guard 77 and the side guards 90 will be described in greater detail. FIG. 5 is a perspective view showing the skid guard 77 and the side guards 90, FIG. 6 is a side view showing the skid guard 77 and the side guards 90, FIG. 7 is a front view showing the skid guard 77 and the side guards 90, and FIG. 8 is a substantially horizontal sectional view taken along a line X-X in FIG. 2, showing a state where the skid guard 77 and the side guards 90 are mounted as designed.

The side guards 90 are a pair of left and right plate members and have protruding surfaces 90$s$ which protrude in the vehicle's widthwise direction so as to be attached closely to outer surfaces of the lower tank portions 66C of the front fuel tank 66.

Figure 6:
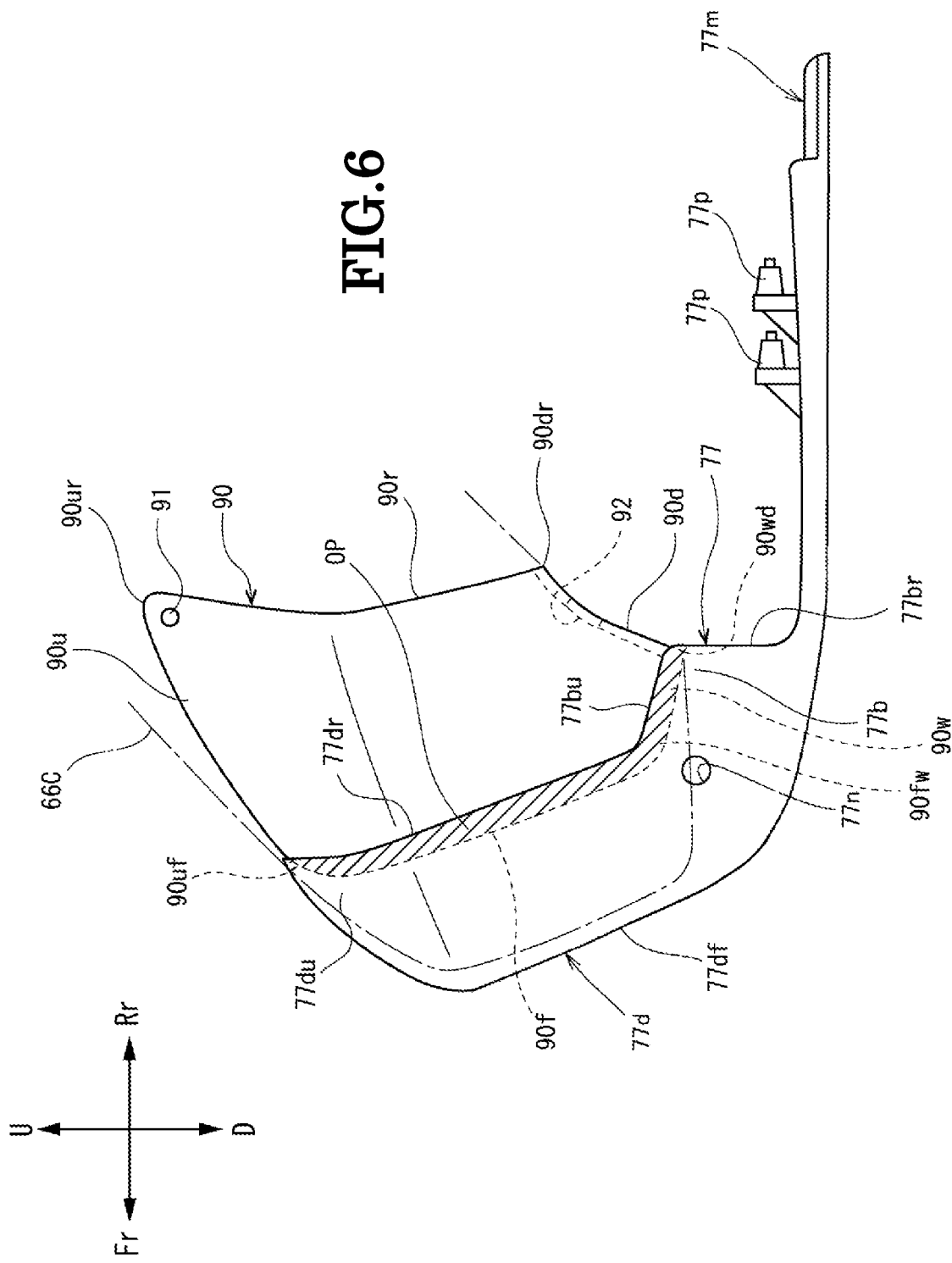
FIG. 6 is a side view showing the skid guard and the side guard which are shown in FIG. 2.

As shown in FIG. 6, the side guard 90 has a substantially pentagonal shape which projects downward when seen from the side. To describe this in greater detail, when seen from the side, the side guard 90 has a guard upper end portion 90$u$ which extends to the rear while sloping upward so as to continuously follow a front upper surface 66$d$ of the lower tank portion 66C, a guard front end portion 90$f$ which slopes downward and toward the rear from a front corner portion 90$uf$ of the guard upper end portion 90$u$, a guard front lower end portion 90$w$ which slopes moderately downward to the rear from a lower corner portion 90$fw$ of the guard front end portion 90$f$, a guard rear lower end portion 90$d$ which slopes upward and toward the rear from a lower corner portion 90$wd$ of the guard front lower end portion 90$w$, and a guard rear end portion 90$r$ which connects an upper corner portion 90$dr$ of the guard rear lower end portion 90$d$ and a rear corner portion 90$ur$ of the guard upper end portion 90$u$.

The side guard 90 is fixed to the front fuel tank 66 via screws as required at two locations such as an upper fixing portion 91 which is opened near the rear corner portion 90$ur$ of the guard upper end portion 90$u$ and a lower fixing portion 92 which is bent inward in the vehicle's widthwise direction from the guard rear lower end portion 90$d$. Namely, the side guard 90 is fastened to the vehicle only at a rear portion of the side guard 90 which faces the rear of the vehicle.

As shown in FIG. 5, the skid guard 77 is made up integrally of the front wall 77$c$ which is provided at a center, the pair of left and right protruding portions 77$d$, 77$d$ which formed on both sides of the front wall 77$c$ to protrude to the front, the side walls 77$b$, 77$b$ which extend substantially to the rear from edge portions of transversely outer lower portions of the protruding portions 77$d$, 77$d$, and a bottom wall 77$m$ which extends to the rear from lower edges of the protruding portions 77$d$, 77$d$ and the side walls 77$b$, 77$b$.

The front wall 77$c$ has a front wall lower 77$g$ which slopes downward and toward the rear, and a front wall upper 77$h$ which slopes upward and toward the rear from an upper edge of the front wall lower 77$g$. The front wall lower 77$g$ is fixed to the down frame lower portions 26B with a plurality of bolts 103, 103 (refer to FIG. 4). The front wall upper 77$h$ is a portion which is disposed below the radiators 101, 101, and a plurality of opening portions 77$j$, 77$j$, 77$k$ are formed in the front wall upper 77$h$. A mesh member 105 (refer to FIGS. 4, 7) which is made up of a metallic net is fixed to the front wall upper 77$h$ to overlap the opening portions 77$j$, 77$j$, 77$k$. The mesh member 105 has a mesh size of something which permits the passage of only running air to the rear but prevents the passage of muddy water, mud, sand and the like which come flying from the front to the rear.

The protruding portions 77$d$, 77$d$ each have, as shown in FIG. 6, a protruding portion front surface 77$df$ which slopes downward and toward the rear when seen from the side and which protrudes to the front, a protruding portion upper surface 77$du$ which is positioned above the protruding portion front surface 77$df$ and which slopes upward and toward the rear when seen from the side, and a protruding portion rear end portion 77$dr$ which slopes downward and toward the rear from a rear end portion of the protruding portion upper surface 77$du$ substantially in parallel to the protruding portion front surface 77$df$.

The side walls 77$b$, 77$b$ each have, when seen from the side, a side wall upper end portion 77$bu$ which is connected to the protruding portion rear end portion 77$dr$ and which slopes downward and toward the rear less steeply than the protruding portion rear end portion 77$dr$, and a wall portion rear end portion 77$br$ which is connected to the side wall upper end portion 77$bu$ and which slopes downward perpendicularly.

In addition, screw passage holes 77$n$ are opened individually substantially at boundary portions between the side walls 77$b$ and the protruding portions 77$d$, 77$d$ in the skid guard 77 so that screws 89$d$ (refer to FIG. 2) are passed therethrough to fasten the skid guard 77 to the front fuel tank 66. Attaching portions 77$p$ which project upward and rearward are provided at a rear portion of the bottom wall 77$m$ and are then fixed to a cross-pipe, not shown, as required.

Further, as shown in FIG. 7, recess portions 77$r$, 77$r$ which are depressed rearward are formed on the front wall lower 77$g$ of the skid guard 77 so that attaching bolts 103 (refer to FIG. 4) are passed therethrough to attach the skid guard 77 to the down frame 26 (refer to FIG. 1), and through holes 77$t$ are opened individually in bottoms of the recess portions 77$r$, 77$r$. Rubber mounts (not shown) are fitted individually in the through holes 77$t$. In addition, a plurality of screw passage holes 77$u$ are opened in a circumferential edge portion of the front wall upper 77$h$ so that screws are passed therethrough to fix the mesh member 105. A substantially trapezoidal cutout portion 77$v$ is formed in a center of an upper end portion of the front wall upper 77$h$ so as to avoid the interference of the front wall upper 77$h$ with the down frame upper portion 26A (refer to FIG. 4).

In the side guards 90 and the skid guard 77 which are fixed to the front fuel tank 66 in the way described above, as shown in FIGS. 5 and 6, the guard front end portions 90$f$ of the side guards 90 extend substantially parallel to the protruding portion rear end portions 77$dr$ of the skid guard 77, and the guard front lower end portions 90$w$ extend substantially parallel to the side wall upper end portions 77$bu$ of the skid guard 77. The side guards 90 cover the tank outermost portions 66$u$ of the lower tank portions 66C, and is disposed so that the guard front end portions 90$f$ are positioned farther forward of the vehicle and farther inward in the vehicle's widthwise direction than the protruding portion rear end portions 77$dr$ of the skid guard 77, and that the guard front lower end portions 90$w$ are positioned father forward of the vehicle and farther inward in the vehicle's widthwise direction than the side wall upper end portions 77$bu$ of the skid guard 77.

By adopting this configuration, the side guards 90 form overlap portions OP between the skid guard 77 and themselves in positions lying farther forward of the vehicle than the tank outermost portions 66$u$.

As shown in FIG. 8, a gap SP, which is defined in the vehicle's widthwise direction, is provided in each of the overlap portions OP. Namely, a gap SP is provided between the guard front end portion 90*f* of the side guard 90 and the protruding portion rear end portion 77*dr* of the skid guard 77, and a gap SP is provided between the guard front lower end portion 90*w* of the side guard 90 and the side wall upper end portion 77*bu* of the skid guard 77. These gaps SP are opened transversely outward in the vehicle's widthwise direction and toward the rear of the vehicle. A bent portion 77*dc* which projects transversely outward is provided at each of the protruding portion rear end portions 77*dr* of the skid guard 77 in a position lying close to the guard front end portion 90*f* of the side guard 90.

FIG. 8 is a sectional view taken along a line X-X in FIG. 2, showing a section taken along a horizontal line which passes through the mesh member 105. As shown in FIG. 8, the exhaust pipe 62 is disposed between the left and right down frame lower portions 26B, 26B to extend in the front-and-rear direction. The exhaust pipe 62 and the cylinder portion 43 are disposed at the rear of the mesh member 105. A fuel outlet piping 117 is disposed between the cylinder portion 43 and the left front fuel tank 66L to extend in the front-and-rear direction.

A starter motor 131, which is provided on the crankcase 42 (refer to FIG. 1), is disposed at the rear of the cylinder portion 43. Further, two ECUs (Engine Control Units) 141, 142 are disposed at the rear of the starter motor 131, and the ECUs 141, 142 are supported on the left and right center frames 23 (refer to FIG. 2) via stays (not shown). The rear cushion unit 28 is disposed at the rear of the ECUs 141, 142.

Hereinafter, how running air flows after it has passed through the mesh member 105 will be described by reference to FIG. 8. Firstly, flows of air near the overlap portions OP will be described. Part of running air which has passed through the mesh member 105 is guided to the overlap portions OP as indicated by arrows W1 after passing between a front wall 66*f* of the front fuel tank 66 and the skid guard 77, and then flows to the rear and transversely outward of the vehicle.

Here, since the gaps SP provided in the overlap portions OP are opened transversely outward in the vehicle's widthwise direction and toward the rear of the vehicle, air which has flowed along the front walls 66*f* to thereby be warmed (warm air) flows toward the rear of the vehicle and away from an outer surface of the front fuel tank 66 while cooling the outer surface of the front fuel tank 66, as indicated by arrows W2.

Next, flows of air inside the front fuel tank 66 will be described. An inner wall projecting portion 66*p* which projects transversely inward in the vehicle's widthwise direction is formed at a rear end portion of an inner wall 66*n* of the right front fuel tank 66R. In the inner wall projecting portion 66*p*, a front surface 66*q* extends gradually inward in the vehicle's widthwise direction into an arc shape in section as it extends rearward, and a back surface 66*r* extends in the vehicle's widthwise direction.

By adopting this configuration, as indicated by an arrow M, running air which has passed through the mesh member 105 from the front of the vehicle to flow into the side where the engine 41 is disposed is caused to flow between the cylinder portion 43 and the inner wall 66*n* to the rear while being deflected obliquely to the left as indicated by an arrow N by the inner wall projecting portion 66*p* to thereby cool the starter motor 131 and the two ECUs 141, 142.

In addition, the running air which has passed through the mesh member 105 is divided to flow to the left and right at the left and right down frame lower portions 26B, 26B as indicated by arrows P, Q and eventually flows toward the engine 41. Further, as indicated by arrows R, S, running air which has passed through a tank recess portion 66*h* of the left front fuel tank 66L passes between the front fuel tank 66L and the cylinder portion 43 to flow to the rear.

The left front fuel tank 66L extends farther rearward than the right front fuel tank 66R at a rear end thereof. The rear end of the left front fuel tank 66L substantially coincides in position with a rear end of the starter motor 131 which is disposed at the rear of the cylinder portion 43 in the front-and-rear direction. A rear end of the right front fuel tank 66R substantially coincides in position with a rear end of the cylinder portion 43 in the front-and-rear direction. By disposing the left and right front fuel tanks 66L, 66R in the way described above, the shapes of the left and right front fuel tanks 66L, 66R can be made different according to different parts arrangements on the left- and right-hand sides of the vehicle body, thereby making it possible to increase the tank capacity as a whole.

Thus, as has been described heretofore, according to this embodiment, since the skid guard 77 and the side guards 90 are disposed to have the overlap portions OP where they overlap partially, there is occurring no such situation that the front fuel tank 66 is exposed between the skid guard 77 and the side guards 90, whereby the external design of the motorcycle 10 is enhanced. Additionally, it can be made difficult for mud or stone to enter from the gaps between the skid guard 77 and the side guards 90, thereby making it possible to enhance the tank protecting functions of the skid guard 77 and the side guards 90. In addition, it is possible to enhance the rigidity of the periphery of the front fuel tank 66 while suppressing a remarkable increase in weight thereof. Further, the skid guard 77 and the side guards 90 are formed by separate members, whereby servicing for maintenance is facilitated.

Since the side guards 90 are provided to cover the tank outermost portions 66*u* of the front fuel tank 66 which protrude most outward of the vehicle, it is possible to provide a superior fuel tank protecting function when the vehicle falls down. Additionally, the overlap portion OP is positioned farther forward of the vehicle than the tank outermost portions 66*u*, and this makes it difficult for a foot of a rider of the vehicle to be caught by the overlap portions OP, thereby improving the operability of the vehicle.

The overlap portions OP are formed between the guard front end portions 90*f* of the side guards 90 and the protruding portion rear end portions 77*dr* of the skid guard 77 and the guard front end portions 90*f* of the side guards 90 are positioned farther inward in the vehicle's widthwise direction than the protruding portion rear end portions 77*dr* of the skid guard 77. Thus, the guard front end portions 90*f* of the side guards 90 can be covered by the protruding portion rear end portions 77*dr* of the skid guard 77.

The gaps SP are provided in the overlap portions OP in the vehicle's widthwise direction, and therefore, air within the skid guard 77 can be caused to flow along the outer surface side of the front fuel tank 66 to enhance the air guiding property, thereby making it possible to enhance the cooling effect of the front fuel tank 66.

The gaps SP are opened outward in the vehicle's widthwise direction and toward the rear of the vehicle, whereby air within the skid guard 77 can be caused to flow outward in the vehicle's widthwise direction from the overlap portions OP, thereby making it possible to improve the aerodynamic characteristics of the vehicle. In addition, warm air can be guided to move away from the front fuel tank 66, so that warm air can be guided to outer sides of leg portions of the rider, thereby making it difficult for warm air to flow against the rider.

Additionally, since the side guards 90 are fastened to the vehicle only at the rear portion thereof which faces the rear of the vehicle, the number of fastening portions can be reduced, which can provide superior assembling and maintenance properties.

Thus, while the embodiment of the invention has been described heretofore, the invention is not limited thereto but can be modified or altered as required. For example, the shapes of the skid guard 77 and the side guards 90 are not limited at all to those illustrated in the drawings and hence can be modified as required. In the embodiment, the invention is described as being applied to the motorcycle. However, the invention may be applied to other saddle riding vehicles including an all-terrain vehicle and the like.

DESCRIPTION OF REFERENCE NUMERALS AND CHARACTERS

10 Motorcycle (Saddle-riding vehicle)
21 head pipe
22 Main frame
41 Engine
62 Exhaust pipe
66 Front fuel tank (Fuel tank)
66u Tank outermost portion
77 Skid guard
77dr Protruding portion rear end portion (Rear end portion)
90 Side guard
90f Guard front end portion (Front end portion)
OP Overlap portion
SP Gap

The invention claimed is:

1. A saddle-riding vehicle, comprising:
a body frame;
an engine which is supported on the body frame;
an exhaust pipe which extends rearward from a front portion of the engine;
a fuel tank which is disposed on a side of the engine;
a skid guard which covers the engine and the exhaust pipe from fronts thereof; and
a side guard which covers a side portion of the fuel tank,
wherein the skid guard and the side guard are disposed to have an overlap portion where the skid guard and the side guard overlap partially, and
wherein a gap is provided in the overlap portion in the vehicle's widthwise direction, and the gap extends throughout the entire overlap portion.

2. The saddle-riding vehicle according to claim 1, wherein the side guard is provided to cover a tank outermost portion, which protrudes most outward of the vehicle, of the fuel tank, and
the overlap portion is positioned farther forward of the vehicle than the tank outermost portion.

3. The saddle-riding vehicle according to claim 1, wherein the gap is opened outward in the vehicle's widthwise direction and toward a rear of the vehicle.

4. The saddle-riding vehicle according to claim 1, wherein the side guard is fastened to the vehicle only at a rear portion thereof which faces the rear of the vehicle.

5. A saddle-riding vehicle, comprising:
a body frame,
an engine which is supported on the body frame;
an exhaust pipe which extends rearward from a front portion of the engine;
a fuel tank which is disposed on a side of the engine;
a skid guard which covers the engine and the exhaust pipe from fronts thereof; and
a side guard which covers a side portion of the fuel tank,
wherein the skid guard and the side guard are disposed to have an overlap portion where the skid guard and the side guard overlap partially,
wherein the overlap portion is formed between a front end portion (90f) of the side guard and a rear end portion of the skid guard, and
the front end portion of the side guard is positioned farther inward in a vehicle's widthwise direction than the rear end portion of the skid guard.

* * * * *